Sept. 4, 1962    M. W. FORTH ET AL    3,052,192
MATERIAL PROCESSING MACHINE
Filed Dec. 15, 1960    3 Sheets-Sheet 1
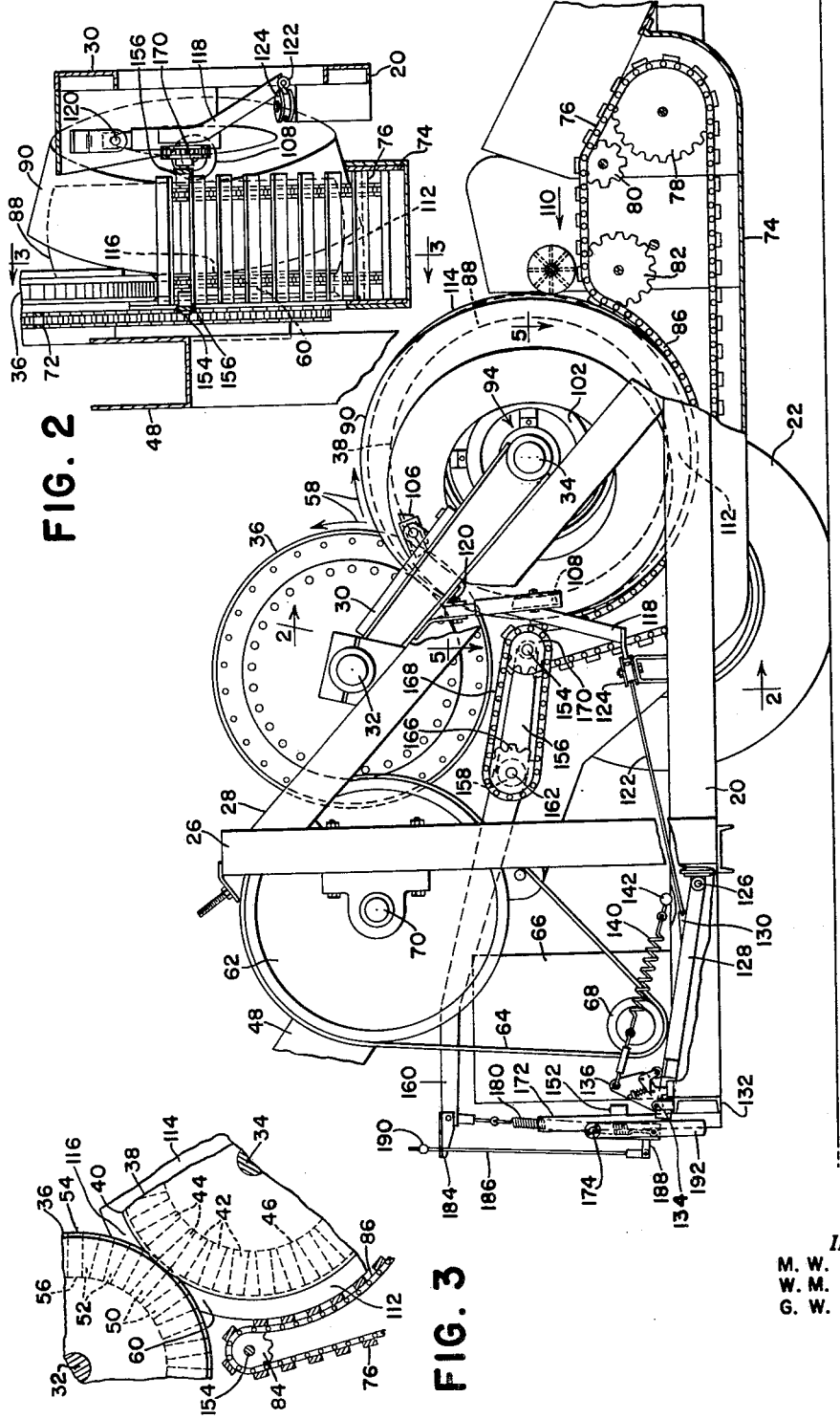
INVENTORS
M. W. FORTH
W. M. ROLL
G. W. JENKINS Sept. 4, 1962 M. W. FORTH ET AL 3,052,192
MATERIAL PROCESSING MACHINE
Filed Dec. 15, 1960 3 Sheets-Sheet 2
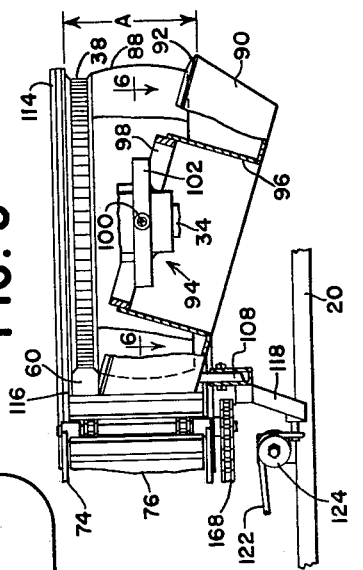
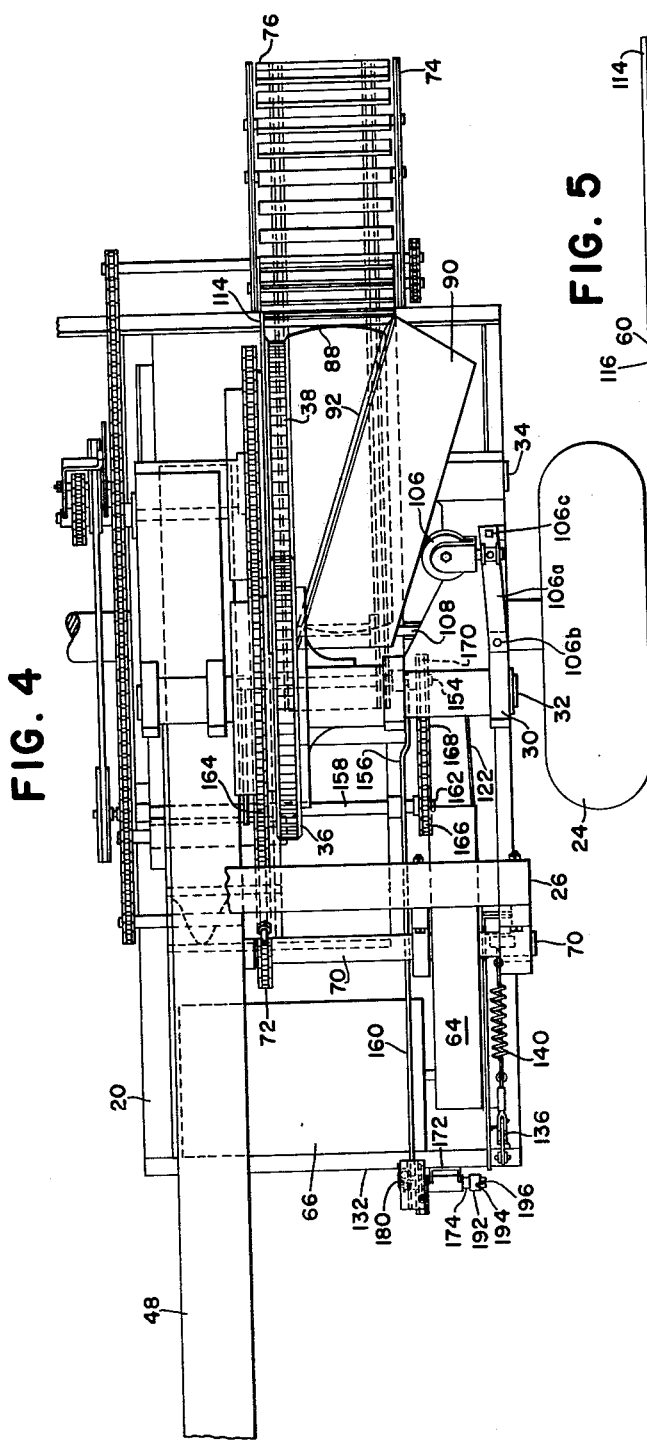
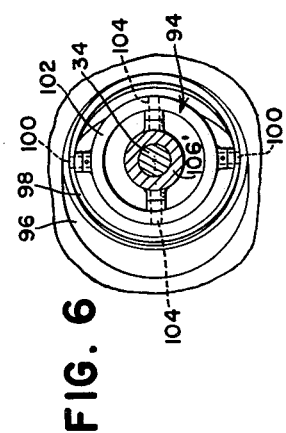
*INVENTORS*
M. W. FORTH
W. M. ROLL
G. W. JENKINS

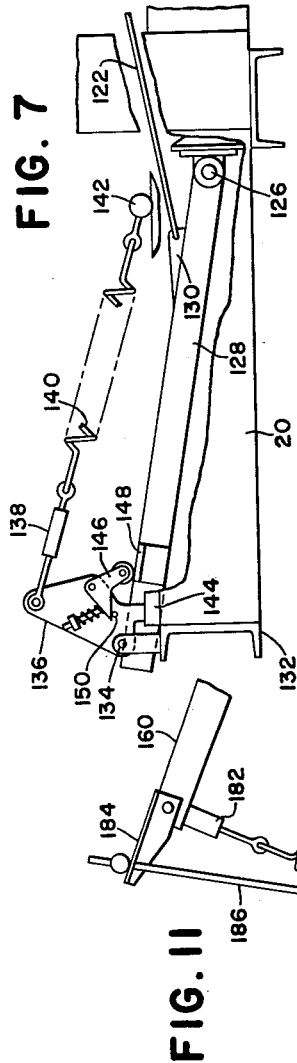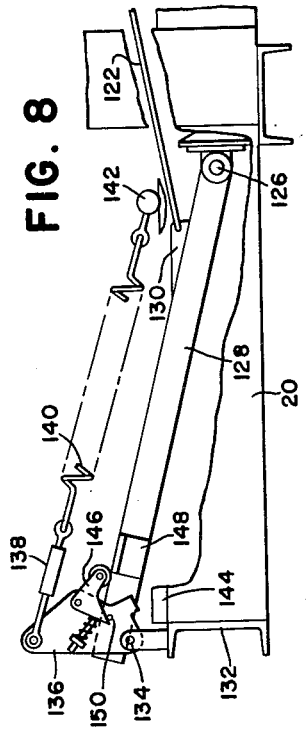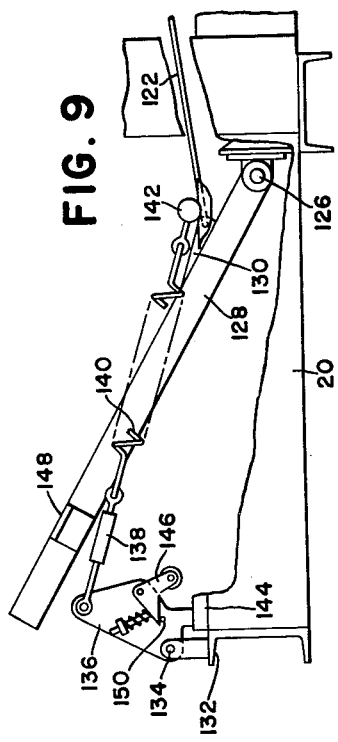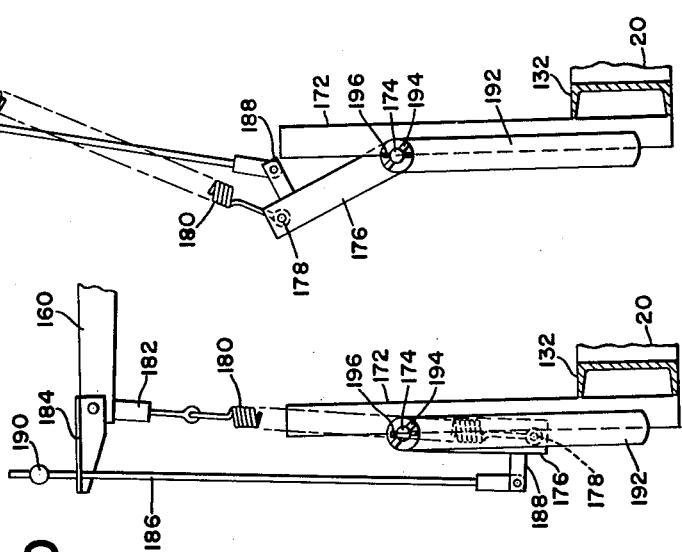

United States Patent Office 3,052,192
Patented Sept. 4, 1962

3,052,192
MATERIAL PROCESSING MACHINE
Murray W. Forth and Walter M. Roll, Moline, and Glenn W. Jenkins, Rock Island, Ill., assignors to Deere & Company, Moline, Ill., a corporation of Delaware
Filed Dec. 15, 1960, Ser. No. 75,982
18 Claims. (Cl. 107—14)

This invention relates to a material processing machine and more particularly to a machine of the type in which material is received, compressed and extruded through die means to form compression products such as pellets, wafers and the like of relatively small size and relatively high density. Still more particularly, the invention pertains to a machine useful for handling agricultural material which is picked up from windrows or other previously harvested crops.

In machines of this character, notably in those operating on forage crops and the like in the field, the pressures are extremely high and quite often a foreign object is picked up with the material and subjected to the die means. If some provision is not made for relieving the feeding mechanism, considerable damage may result. According to the present invention, such releasable means are provided for allied components, to the end that foreign objects and other conditions causing overloads are accommodated, in which respect it is a subsidiary object to discontinue the driving means for the feed means so that ensuing damage is prevented. It is an object of the invention to utilize, in conjunction with die means, means for pre-compressing the material in at least two directions normal to each other so as to pre-compact the material before it enters the bite between a pair of cooperative die members and to provide these pre-compression means with releasable safety devices accommodating overloads in either of them. It is a further object of the invention to provide overload devices that may be readily reset after released or tripped.

The foregoing and other important objects and desirable features inherent in and encompassed by the invention will become apparent as a preferred embodiment thereof is disclosed in detail in the ensuing description and accompanying sheets of drawings, the figures of which are described below.

FIG. 1 is a side view, with portions broken away, of a representative machine of the character discussed.

FIG. 2 is a fragmentary transverse sectional view as seen generally along the line 2—2 of FIG. 1.

FIG. 3 is a simplified view, somewhat schematic and fragmentary, of that portion of the machine seen along the line 3—3 of FIG. 2.

FIG. 4 is a plan of the machine, with a portion of the left side thereof broken away.

FIG. 5 is a fragmentary sectional view as seen generally along the line 5—5 of FIG. 1.

FIG. 6 is a fragmentary sectional view as seen along the line 6—6 of FIG. 5.

FIG. 7 is a fragmentary view, on an enlarged scale and with portions broken away, showing the release mechanism for the axial pre-compression feed element.

FIG. 8 is a similar view, showing the mechanism just prior to release thereof.

FIG. 9 is a similar view showing the mechanism fully released.

FIG. 10 is a fragmentary simplified view, on an enlarged scale, of the mechanism for controlling the position of the radial compression means.

FIG. 11 is a similar view showing the means in its released condition.

The machine chosen for purposes of illustration comprises a relatively heavy main frame 20 carried on right and left hand ground wheels 22 and 24 for adaptation to be drawn over a field of previously harvested crops by a conventional draft vehicle, such as a tractor, not shown. The main frame includes uprights 26 and downwardly and forwardly inclined bars 28 which carry thereon a secondary frame 30 for supporting a pair of transverse parallel cross shafts 32 and 34. These shafts respectively carry press or die wheels 36 and 38.

Regarding first the die wheel 38, it may be considered as an annulus having a peripheral edge 40 (FIG. 3) and a plurality of uniformly circumferentially spaced radially disposed die openings 42, each pair of die openings being spaced by an intervening die block 44. The annulus has an inner periphery 46, and each die opening 42 has its inlet at the outer edge 40 and its outlet at the inner peripheral surface 46. Material extruded through the die openings in a radially inwardly direction, in a manner to be presently described, will exit at the die opening outlets 46 to be received in any conventional manner, as by an elevator 48 (FIG. 1). Any cooperative form of die member may be used in connection with the annulus member or wheel 38. However, in the present preferred example, the die member comprises the other wheel 36 which is constructed substantially identically so that it also has a plurality of uniformly circumferentially spaced radially disposed die openings 50 spaced apart respectively by intervening die blocks 52 so that each opening has its inlet at the outer peripheral edge 54 of the wheel 36 and its outlet at the inner peripheral edge 56 of the annulus thus formed. The wheels are timed for relative rotation in opposite directions, as shown by the arrows 58 in FIG. 1, so that the blocks of one wheel register successively with the die openings in the other.

The two wheels are of course arranged in what may be regarded as rolling relationship; that is, the peripheral edge 40 of the wheel 38 is closely tangentially related to the peripheral edge 54 of the wheel 36, and the area or zone just ahead of the point of tangency forms a material-receiving bite designated by the numeral 60 (FIG. 3). It will be seen, consequently, that material fed into the bite 60 will be received between the cooperating peripheral edges of the wheels and that this material will be forced by the die blocks of one wheel into the die openings of the other wheel. As the material accumulates in the die openings, it is ultimately extruded in the form of a compression product having the cross sectional area and shape of the die openings from which it is extruded. As already noted, the pressures involved are relatively high and the products are small and have relatively high densities.

The upright portion 26 of the frame 20 appropriately journals a flywheel 62 which is belt-driven at 64 from any suitable source of power, here illustrated as an internal combustion engine 66 having its crankshaft provided with a driving pulley 68. The flywheel in turn has its shaft 70 connected in driving relation to the two wheels 36 and 38 by drive means including chain and sprocket mechanism indicated in its entirety by the numeral 72, the details of which are not important, since any other suitable drive means could be employed.

Beneath the wheels 36 and 38 is a fore-and-aft conveyor trough 74 which contains a feed element in the form of an endless conveyor 76. In a typical machine as used for the handling of previously harvested forage crops, the conveyor 76 will be fed by pickup means (not shown here) so that the conveyor 76 ultimately delivers the picked up material to the die wheels 36 and 38, delivering thereto at the previously described bite 60. The conveyor is carried on a plurality of sets of shaft-carried sprockets, as at 78, 80, 82 and 84 (FIGS. 1 and 3), and it will be seen in FIG. 1 that a portion of the conveyor between the sprockets 82 and 84 is arcuate, as at 86, in such manner as to be substantially concentric with the wheel 38 and in embracing but radially spaced relationship to a drum 88 that is coaxially rigidly affixed to one radial face of the wheel 38. In the present case, the mounting of the drum 88 is at the right hand face of the wheel, in which respect it should be noted that the expressions "right" and "left" are used with respect to the position of an observer standing behind the machine and facing forwardly. The relationship between the wheel 38 and the drum 88 is best seen in FIGS. 2, 4 and 5, wherein it will be seen that the drum 88 is partially spherical, having a maximum diameter slightly larger than the wheel. The outer peripheral surface of the drum leads laterally inwardly or to the left to the bite 60 (FIG. 5). Carried in partially encircling relationship to the drum 88 is a feed element 90, here in the form of the section of a cone having an inner annular portion therein forming a ring 92 which is preferably the section of another cone. The axis of rotation of the partially conical feed element 90 is at an angle to the axis of rotation of the wheel 38 and drum 88 so that in the general area of the bite 60 the outer surface of the element 90 is parallel to the axis of the wheel 38 and drum 88. This can be seen best in FIGS. 4 and 5.

The element 90 is carried by the shaft 34 by a universal mounting designated in its entirety at 94 and best shown in FIGS. 5 and 6. The interior of the element 90 is hollow so as to accommodate rigidly therewith a small drum or collar 96 to which is welded or otherwise affixed a coaxial ring 98. This ring is connected by a pair of diametrically opposed pintles 100 to an inner ring 102 which is in turn connected by a pair of diametrically opposed pintles 104 to the hub 106' of the wheel 38. Consequently, the wheel 38, drum 88 and element 90 rotate in unison, but, since the axes of the pintles 100 and 104 are perpendicular to each other, the element 90 will rotate about an outwardly and rearwardly inclined axis. The element 90 is held in this position of rotation by a pair of followers, guides or rollers 106 and 108, to be described in detail below. For the moment, it will suffice to observe that the normal operation of the machine involves the normal position of the element 90 as retained by the rollers 106 and 108.

The wheel 38 is provided at its left hand side or face with a backing ring or annular shield 114 which has a larger outside diameter than the wheel 38 so that a portion of such ring radially overlaps the bite area 60. Actually, the diameter of this ring is generally equal to that of the ring 92 on the element 90 so that the general planes of these two rings converge from front to rear and thus toward the bite area 60 and so that the peripheries of these rings ride the arcuate portion 86 of the conveyor 76, leaving the conveyor portion 86 spaced radially from the underside of the drum 88. Because of this relationship there is provided a material-receiving zone 112 of generally semicircular shape as seen from the side and of generally triangular shape as seen from above (FIG. 5), tapering rearwardly from a width A to the narrow width as shown generally at 116 in the area of the bite 60. Thus the conveyor 76, the upper run of which travels rearwardly in the direction of the arrow 110 in FIG. 1, carries material beneath the element 88 via the run portion 86 and thence upwardly to the bite 60, and radial precompression of the material occurs between the conveyor portion 86 and the undersurface of the drum 88 and axial compression occurs because the rings 92 and 114 converge rearwardly. It will be understood that the ring portion 92 of the element 90 relatively closely fits the periphery of the drum 88 in the area thereof at the bottom thereof and adjacent to the bite 60 so that compression of the material is confined to the area already designated.

There are therefore two zones in which excessive forces may occur. One of these is in the zone 112, wherein radial forces between the element 88 and conveyor portion 86 tend to separate the two; the other is in the area 116 in which axial forces tend to separate the backing ring 114 and element 90. As already described, the normal position of the element 90 is maintained by the rollers 106 and 108. If these rollers are arranged for release from normal positions, the element 90 may swing about at least one of its infinite axes (in the universal joint 94) in response to the development of forces beyond a predetermined value.

As best seen in FIGS. 1, 2 and 5, the positions of the rollers 106, 108 are generally laterally opposite the area, including the narrow zone 116, in which the greatest axial forces occur. According to the present invention, although both rollers may be made releasable and easily restorable, it is found that satisfactory results are obtained by applying the inventive principle to the roller 108, leaving the roller 106 with a mount including an arm 106a pivoted at 106b to the frame 30 and retained by a shear pin 106c, for example, which will shear in extreme conditions. To this end, then, the roller 108 is carried on an arm 118 pivoted to the support or frame structure for lateral swinging about a generally fore and aft pivot 120. The lower or free end of the arm 118 is connected to one end of a cable 122 which is trained about a supportcarried sheave 124. The cable extends rearwardly for connection to releasable means to be presently described.

A rear portion of the support or frame 20 carries a pivot mounting 126 for pivotally mounting one end of a rearwardly extending control member or arm 128. This arm is relatively long and the cable 122 is connected thereto at a point 130 so that the line of pull by the cable 122 is relatively close to the pivot 126. A further rearwardly spaced portion of the frame 20, as at 132, provides a pivot 134 for the mounting of a trippable trigger device 136, here in the form of a substantially triangularly shaped plate having one end thereof provided with a connection 138 to one end of a tension spring 140. The other end of the spring 140 is anchored to a forwardly spaced portion of the frame 20 at 142. A stop 144 on the frame portion 132 limits clockwise rotation of the device 136 to the position shown in FIG. 7. This stop may be made of shock-absorbing material.

A spring-loaded, roller carrying pawl 146 engages a lug 148 rigid on the rear portion of the arm or control member 128. The pawl 146 is stopped at 150 against counter-clockwise rotation beyond the position shown in FIG. 7 and is further biased by its spring to that position. Consequently, the spring 140, acting through the device 136 and pawl 148, acts to hold the arm 128 in the position of FIG. 7, in which position it tensions the cable 122 so as to hold the arm 118 for the roller 108 in its inner position, thus causing the roller 108 to retain the normal or operating position of the element 90. When axial forces in the area 116 develop beyond a predetermined magnitude, as when a foreign object enters the space between the ring 92 and the backing ring 114, the rings 92 and 114 will tend to separate. These forces will be transmitted through the roller 108, arm 118 and cable 122 to the control member 128, tending to rock same upwardly and forwardly about its pivot 126. The relatively short moment arm about the pivot 126 as respects tensional forces in the cable 122 are designed so that a considerable amount of force is required before the lug 148 will clear the pawl 146. This occurs when the camming action between the lug 148 and the pawl 146 reaches the point where the device 136 is rocked in a counter-clockwise direction against the loading of the spring 140 to the position shown in FIG. 8, which shows that the roller on the pawl is just about to slip off of the lug 148 on the arm 128. Completion of the separation is shown in FIG. 9, wherein the lug 148 has passed the roller on the pawl 146 and the spring 140 has returned the device 136 to its position as stopped by the stop 144 on the frame portion 132.

It is at this point that the one-way spring-loaded mounting of the pawl 146 becomes important, because this enables the mechanism to be reset after the cause of the excess force has been removed. This may be accomplished manually by the operator, who has the advantage of the relatively long lever arm of the arm 128 against the relatively small moment arm between the cable 122 and pivot 126. As the operator forces the arm 128 downwardly, the lug 148 will strike the roller on the pawl 146 from above. Since the stop 150 permits the pawl to swing in a clockwise direction, the lug 148 may pass the pawl so as to reset the mechanism in the position of FIG. 7.

The internal combustion engine 66 may be provided with an electrical switch 152 arranged in the path of movement of the free end of the control member or arm 128, so that when the arm swings from its position of FIG. 7 to that of FIG. 9 it will actuate this switch to cut off the engine, thereby disabling the drive means to the wheels 36 and 38 as well as to the conveyor 76. When the arm 128 is moved downwardly to its reset position, it will again actuate the switch to complete the circuit so that the engine may be started.

The rear sprocket set 84, previously described, for the conveyor 76, is carried on a cross shaft 154 at the forward ends of a pair of fore and aft arms 156 which are connected, as by a torque tube 158, to a rearwardly extending control arm 160. The torque tube 158 has coaxially received therein a shaft 162 which has a sprocket 164 thereon driven by the chain drive 72 that drives the wheels 36 and 38 (FIG. 4). The shaft extends leftwardly and is connected to other drive mechanism as illustrated, the details of which are not important, but at its right hand end, the shaft 162 carries a sprocket 166 which is connected by a chain 168 to a sprocket 170 on the previously described shaft 154, whereby the conveyor 76 is driven. Since the shaft 162 is coaxial with the torque tube 158 and since this arrangement provides a pivotal mounting for the arm structure 156—160, it will be seen that clockwise rocking of the arm structure just referred to will cause the shaft 154 and the conveyor carried thereby to depart downwardly and rearwardly from the relationship that it normally occupies with the drum 88. In other words, as the arm structure pivots as aforesaid, the spacing between the conveyor portion and the associated portion of the drum 88 will increase, which is what is required to accommodate overloads that develop excess radial forces, it being understood that the word "radial" is used as respects the annulus established by the die wheel 38. In other words, the size of the area at 112 will be increased. Because of the location of the pivot axis at 162, the increase in this spacing will be relatively rapid, incurring ready release or discharge of the offending obstruction. Moreover, if desired, release of the arm structure deliberately may be employed to clear out the area under concern.

The normal position of the arm 160, and consequently of the conveyor portion in the area 112, is maintained by the mechanism shown best in FIGS. 10 and 11, the former showing the normal position and the latter showing the released position.

The rear frame portion 132 rigidly carries thereon an upright 172 which journals a cross shaft 174 providing a transverse pivot for an arm 176 which is rigidly secured to the cross shaft. A stud 178 on the arm 176 provides an anchor for one end of the tension spring 180, the other end of which is connected to the arm 160 at 182. In the normal position of the parts (FIG. 10) the arm 176 is downwardly, and the stud 178 stops against the rear stop edge of the upright 172, and the line of force through the spring 178 is ahead of the axis of the pivot 174. In other words, an over-center position is established so that in substance the anchor 178 connects the spring 180 to the support frame 20, and any movement of the arm structure 156—160 in a clockwise direction about the axis of the shaft 162 will be resisted by the spring. The spring will of course urge the conveyor portion into normal relationship to the drum 88 so as to create the necessary radial pre-compression forces. As these forces increase, the conveyor portion is displaced rearwardly and downwardly from the drum 88, causing rocking of the arm structure 156—160 in a clockwise direction, causing elevation of its rear end, which elevation is of course resisted by the spring 180.

However, the previously described stud 178, referred to as in substance an anchor on the frame 20, is actually a temporary anchor, since it may be displaced by a second connection between the rear end of the arm 160 and the arm 176. For this purpose, the arm 160 has a rearward extension 184 which is connected by a tension member 186 to an ear 188 rigidly secured to the arm 176 adjacent to the anchor 178. The upper end of the member 186 carries thereon a stop 190 which is normally in vertically spaced relation to the extension 184, the latter being apertured of course to loosely receive the member 186. When the arm 160, and its extension 184, become elevated to a position sufficient to cause engagement between the extension 184 and the stop 190 on the tension member 186, the result is the exertion of a line of force rearwardly of the pivot 174 so as to swing the arm 176 to the other side or rearwardly of its over-center position, it being clear that the mechanical advantage is in favor of the force-transmitting means 186 at this point. This consequently displaces the anchor 178 so that it is free to swing upwardly as the arm 176 swings in a clockwise direction to its position of FIG. 11, enabling maximum elevation of the arm 160 and maximum depression of the forward portion 156, thereby removing the conveyor portion 86 downwardly and rearwardly from its normal relationship to the drum 88 and thereby relieving the excess radial forces developed. When the cause of the obstruction or overload is removed, the conveyor structure may be restored to its original position by resetting the mechanism of FIGS. 10 and 11. For this purpose, the shaft 174 carries loosely thereon a reset arm 192 which is provided with a diametrical slot 194. The reset arm 192 is also axially shiftable on the shaft 174 so that initially its slot 194 is axially clear of a diametrical pin 196 passed through the outer end of the shaft 174. When it is desired to reset the mechanism from the position of FIG. 11 to the position of FIG. 10, the arm 192 is turned relative to the shaft 174 to a position in which its slot 194 will register with the pin 196 in the shaft 174, after which the arm 192 is slid axially until the slot receives the pin. The operator may then turn the arm 192 in a counter-clockwise direction, causing consequent rotation of the shaft 174 in the same direction until the spring anchor 178 again passes to its over-center position as stopped by the rear edge of the upright frame member 172.

The salient features of the construction and operation of the invention have been included in the description thereof and need not be repeated. Features and advantages other than those already set forth will readily occur to those versed in the art, as will many modifications and alterations in the preferred structure illustrated, all of which may be achieved without departure from the spirit and scope of the invention.

What is claimed is:

1. In a machine of the class described, the combination including: a support; an annulus member having a peripheral edge and a plurality of circumferentially spaced die openings respectively having inlets at said edge; a die member generally in radial register with the annulus member and closely tangential to said edge to form therewith a bite for receiving material to be extruded through the die openings by the die member; means mounting the members on the support for rotation of one relative to the other about an axis normal to the radial plane of the annulus member to cause successive registration of the bite and the die openings; a drum mounted on the support coaxially with the annulus member at one side thereof and having a peripheral surface leading axially inwardly to the bite; means for feeding material to said drum surface, including a first feed element mounted on the support for movement generally radially of the drum and operative to compress material radially against said surface axially outwardly of the bite and a second element mounted for movement axially of the annulus and operative to force said material axially inwardly to the bite; first releasable means acting to hold the first element normally in radial compression relative to said surface and releasable in response to radial overloads to enable said first element to move radially away from said surface; and second releasable means acting normally to hold the second element axially inwardly toward the bite and releasable in response to axial overloads to enable said second element to move axially outwardly from the bite.

2. In a machine of the class described, the combination including: a support; an annulus member having a peripheral edge and a plurality of circumferentially spaced die openings respectively having inlets at said edge; a die member generally in radial register with the annulus member and closely tangential to said edge to form therewith a bite for receiving material to be extruded through the die openings by the die member; means mounting the members on the support for rotation of one relative to the other about an axis normal to the radial plane of the annulus member to cause successive registration of the bite and the die openings; a drum mounted on the support coaxially with the annulus member at one side thereof and having a peripheral surface leading axially inwardly to the bite; means for feeding material to said drum surface, including a feed element mounted on the support for movement generally radially of the drum and operative to compress material radially against surface axially outwardly of the bite; and releasable means acting to hold the element normally in radial compression relative to said surface and releasable in response to radial overloads to enable said element to move radially away from said surface.

3. In a machine of the class described, the combination including: a support; an annulus member having a peripheral edge and a plurality of circumferentially spaced die openings respectively having inlets at said edge; a die member generally in a radial register with the annulus member and closely tangential to said edge to form therewith a bite for receiving material to be extruded through the die openings by the die member; means mounting the members on the support for rotation of one relative to the other about an axis normal to the radial plane of the annulus member to cause successive registration of the bite and the die openings; a drum mounted on the support coaxially with the annulus member at one side thereof and having a peripheral surface leading axially inwardly to the bite; means for feeding material to said drum surface, including a feed element mounted for movement axially of the annulus and operative to force material axially inwardly to the bite; and biased releasable means acting normally to hold the element axially inwardly toward the bite and releasable in response to axial overloads to enable said element to move axially outwardly from the bite.

4. In a machine of the class described, the combination including: a support; an annulus member having a peripheral edge and a plurality of circumferentially spaced die openings respectively having inlets at said edge; a die member generally in radial register with the annulus member and closely tangential to said edge to form therewith a bite for receiving material to be extruded through the die openings by the die member; means mounting the members on the support for rotation of one relative to the other about an axis normal to the radial plane of the annulus member to cause successive registration of the bite and the die openings; means for feeding material to the bite, including a rotatable ring in axial alinement with the annulus at one side thereof and overlapping the bite and means mounting the ring for movement between a normal position in which the radial planes of the ring and said one side of the annulus converge toward the bite to direct said material axially into the bite and a released position in which the ring is spaced axially outwardly from the bite; and releasable spring-loaded means on the support and acting on the ring for holding the ring in its normal position and for releasing the ring from said normal position in response to excess axially outwardly directed forces developed at said bite.

5. In a machine of the class described, the combination including: a support; an annulus member having a peripheral edge and a plurality of circumferentially spaced die openings respectively having inlets at said edge; a die member generally in radial register with the annulus member and closely tangential to said edge to form therewith a bite for receiving material to be extruded through the die openings by the die member; means mounting the members on the support for rotation of one relative to the other about an axis normal to the radial plane of the annulus member to cause successive registration of the bite and the die openings; a drum mounted on the support coaxially with the annulus member at one side thereof and having a peripheral surface leading axially inwardly to the bite; means for feeding material to said drum surface, including a feed element mounted on the support for movement generally radially of the drum and operative to compress material radially against said surface axially outwardly of the bite; and releasable means acting to hold the element normally in radial compression relative to said surface and releasable in response to radial overloads to enable said element to move radially away from said surface, said releasable means including an arm, a pivot mounting the arm on the support, a stop on the support for limiting swinging of the arm in one direction, a spring having a connection to the element and a connection to the arm beyond the pivot for holding the arm against the stop in an over-center condition at one side of the pivot so that the spring yieldably opposes movement of the element away from the drum, and a lost-motion connection between the element and the arm operative upon pre-determined movement of the element away from the drum to swing the arm away from the stop to an over-center condition at the other side of the pivot so that the connection of the spring to the arm swings toward the connection of the spring to the element.

6. In a machine of the class described, the combination including: a support; an annulus member having a peripheral edge and a plurality of circumferentially spaced die openings respectively having inlets at said edge; a die member generally in radial register with the annulus member and closely tangential to said edge to form therewith a bite for receiving material to be extruded through the die openings by the die member; means mounting the members on the support for rotation of one relative to the other about an axis normal to the radial plane of the annulus member to cause successive registration of the bite and the die openings; a drum mounted on the support coaxially with the annulus member at one side thereof and having a peripheral surface leading axially inwardly to the bite; means for feeding material to said drum surface, including a feed element mounted on the support for movement generally radially of the drum and operative to compress material radially against said surface axially outwardly of the bite; and releasable means acting to hold the element normally in radial compression relative to said surface and releasable in response to radial overloads to enable said element to move radially away from said surface, said releasable means including a spring having a connection at one end to the element, a trippable over-center device movable on the support between normal and tripped conditions, means connecting the other end of the spring to the device in its normal condition to provide an anchor for the spring to enable loading of the spring by the element as it tends to move away from its normal position, and means connected between the element and said device and operative upon predetermined loading of the spring to trip the device for at least partially unloading the spring.

7. The invention defined in claim 6 including: means connected to and for resetting the tripped device to its normal condition.

8. In a machine of the class described, the combination including: a support; an annulus member having a peripheral edge and a plurality of circumferentially spaced die openings respectively having inlets at said edge; a die member generally in radial register with the annulus member and closely tangential to said edge to form therewith a bite for receiving material to be extruded through the die openings by the die member; means mounting the members on the support for rotation of one relative to the other about an axis normal to the radial plane of the annulus member to cause successive registration of the bite and the die openings; a drum mounted on the support coaxially with the annulus member at one side thereof and having a peripheral surface leading axially inwardly to the bite; means for feeding material to said drum surface, including a feed element mounted on the support for movement generally radially of the drum and operative to compress material radially against said surface axially outwardly of the bite; and releasable means acting to hold the element normally in radial compression relative to said surface and releasable in response to radial overloads to enable said element to move radially away from said surface, said releasable means including a spring having a first connection to the element and a second connection to the support, one of said connections including a releasable device operative on the spring in a first condition enabling the force of the spring to act yieldably to hold the element toward its normal positions and a second condition at least partially reducing the force of the spring on the element, and means connected between the element and the device for changing the device to its second condition in response to predetermined movement of the element away from its normal position.

9. In a machine of the class described, the combination including: a support; an annulus member having a peripheral edge and a plurality of circumferentially spaced die openings respectively having inlets at said edge; a die member generally in radial register with the annulus member and closely tangential to said edge to form therewith a bite for receiving material to be extruded through the die openings by the die member; means mounting the members on the support for rotation of one relative to the other about an axis normal to the radial plane of the annulus member to cause successive registration of the bite and the die openings; a drum mounted on the support coaxially with the annulus member at one side thereof and having a peripheral surface leading axially inwardly to the bite; means for feeding material to said drum surface, including a feed element mounted on the support for movement generally radially of the drum and operative to compress material radially against said surface axially outwardly of the bite; and releasable means acting to hold the element normally in radial compression relative to said surface and releasable in response to radial overloads to enable said element to move radially away from said surface, said releasable means including a spring having a first connection to the element and a second connection to the support, one of said connections including a resettable trippable device operative on the spring in a first condition enabling the force of the spring to act yieldably to hold the element toward its normal positions and a second condition at least partially reducing the force of the spring on the element, means connected between the element and the device for tripping the device to its second condition in response to predetermined movement of the element away from its normal position, and means for resetting the device after tripping thereof.

10. In a machine of the class described, the combination including: a support; an annulus member having a peripheral edge and a plurality of circumferentially spaced die openings respectively having inlets at said edge; a die member generally in radial register with the annulus member and closely tangential to said edge to form therewith a bite for receiving material to be extruded through the die openings by the die member; means mounting the members on the support for rotation of one relative to the other about an axis normal to the radial plane of the annulus members to cause successive registration of the bite and the die openings; a drum mounted on the support coaxially with the annulus member at one side thereof and having a peripheral surface leading axially inwardly to the bite; means for feeding material to said drum surface, including a feed element mounted for movement axially of the annulus and operative to force material axially inwardly to the bite; and biased releasable means acting normally to hold the element axially inwardly toward the bite and releasable in response to axial overloads to enable said element to move axially outwardly from the bite, said releasable means including a spring having a first connection to the element and a second connection to the support, one of said connections including a releasable device operative on the spring in a first condition enabling the force of the spring to act yieldably to hold the element toward its normal positions and a second condition at least partially reducing the force of the spring on the element, and means connected between the element and the device for changing the device to its second condition in response to predetermined movement of the element away from its normal position.

11. In a machine of the class described, the combination including: a support; an annulus member having a peripheral edge and a plurality of circumferentially spaced die openings respectively having inlets at said edge; a die member generally in radial register with the annulus member and closely tangential to said edge to form therewith a bite for receiving material to be extruded through the die openings by the die member; means mounting the members on the support for rotation of one relative to the other about an axis normal to the radial plane of the annulus member to cause successive registration of the bite and the die openings; a drum mounted on the support coaxially with the annulus member at one side thereof and having a peripheral surface leading axially inwardly to the bite; means for feeding material to said drum surface, including a feed element mounted for movement axially of the annulus and operative to force material axially inwardly to the bite; and biased releasable means acting normally to hold the element axially inwardly toward the bite and releasable in response to axial overloads to enable said element to move axially outwardly from the bite, said releasable means including a spring having a first connection to the element and a second connection to the support, one of said connections including a resettable trippable device operative on the spring in a first condition enabling the force of the spring to act yieldably to hold the element toward its normal positions and a second condition at least partially reducing the force of the spring on the element, means connected between the element and the device for tripping the device to its second condition in response to predetermined movement of the element away from its normal position, and means for resetting the device after tripping thereof.

12. In a machine of the class described, the combination including: a support; an annulus member having a peripheral edge and a plurality of circumferentially spaced die openings respectively having inlets at said edge; a die member generally in radial register with the annulus member and closely tangential to said edge to form therewith a bite for receiving material to be extruded through the die openings by the die member; means mounting the members on the support for rotation of one relative to the other about an axis normal to the radial plane of the annulus member to cause successive registration of the bite and the die openings; drive means for effecting said relative movement; means on the support for feeding material to the bite and including first and second separate elements normally conditioned respectively to precompress the material radially and axially of the annulus before delivery thereof to the bite, each element being shiftable out of its precompressing condition; first spring loaded releasable means normally holding the first element in its precompressing condition and releasable to enable said first element to shift out of said condition in response to radial overload forces; and second spring-loaded means normally holding the second element in its precompressing condition and releasable to enable said second element to shift out of its said precompressing condition in response to axial overload forces developed in the material.

13. The invention defined in claim 12, including: means operative in response to release of one of said releasable means for discontinuing the drive means.

14. In a machine of the class described, the combination including: a support; an annulus member having a peripheral edge and a plurality of circumferentially spaced die openings respectively having inlets at said edge; a die member generally in radial register with the annulus member and closely tangential to said edge to form therewith a bite for receiving material to be extruded through the die openings by the die member; means mounting the members on the support for rotation of one relative to the other about an axis normal to the radial plane of the annulus member to cause successive registration of the bite and the die openings; drive means for effecting said relative movement; means on the support for feeding material to the bite and including an element normally conditioned to precompress the material radially of the annulus before delivery thereof to the bite, said element being shiftable out of its precompressing condition; and spring-loaded means normally holding said element in its precompressing condition and releasable to enable said second element to shift out of its said precompressing condition in response to overload forces developed in the material.

15. The invention defined in claim 14 including: means operative in response to release of said releasable means for discontinuing the drive means.

16. In a machine of the class described, the combination including: a support; an annulus member having a peripheral edge and a plurality of circumferentially spaced die openings respectively having inlets at said edge; a die member generally in radial register with the annulus member and closely tangential to said edge to form therewith a bite for receiving material to be extruded through the die openings by the die member; means mounting the members on the support for rotation of one relative to the other about an axis normal to the radial plane of the annulus member to cause successive registration of the bite and the die openings; drive means for effecting said relative movement; means on the support for feeding material to the bite and including an element normally conditioned to precompress the material axially of the annulus before delivery thereof to the bite, said element being shiftable out of its precompressing condition; and spring-loaded means normally holding said element in its precompressing condition and releasable to enable said element to shift out of its said precompressing condition in response to overload forces developed in the material.

17. The invention defined in claim 16, including: means operative in response to release of said releasable means for discontinuing the drive means.

18. In a machine of the class described, the combination including: a support; an annulus member having a peripheral edge and a plurality of circumferentially spaced die openings respectively having inlets at said edge; a die member generally in radial register with the annulus member and closely tangential to said edge to form therewith a bite for receiving material to be extruded through the die openings by the die member; means mounting the members on the support for rotation of one relative to the other about an axis normal to the radial plane of the annulus member to cause successive registration of the bite and the die openings; means on the support for feeding material to the bite and including a feed element normally operative to compress material adjacent to the bite and movable on the support for displacement to a released condition when excess material occurs; and means for releasably holding the element in its normally operative condition, including a control member movable on the support between an element-holding position and an element releasing position, a spring-loaded device on the support biased to engage the control member for normally retaining same in its holding position, said device and control member having cooperative portions enabling disengagement between the two upon predetermined movement of the control member toward its releasing position, and a force-transmitting connection between the element and control member for transmitting to the control member forces developed at the element tending to displace the element whereby such forces in excess of a predetermined value move the control member sufficiently to cause disengagement thereof from the device.

References Cited in the file of this patent

UNITED STATES PATENTS

| 1,803,344 | Noxon | May 5, 1931 |
| 2,675,768 | Helm | Apr. 20, 1954 |

FOREIGN PATENTS

| 566,820 | Germany | Dec. 22, 1932 |